Jan. 15, 1957  J. A. HESS  2,777,339
PORTABLE BORING MACHINE
Filed July 30, 1953  5 Sheets-Sheet 1
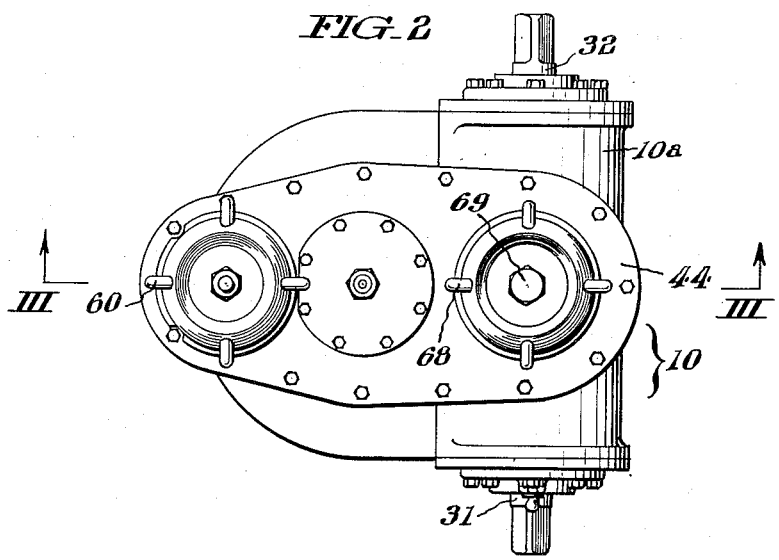
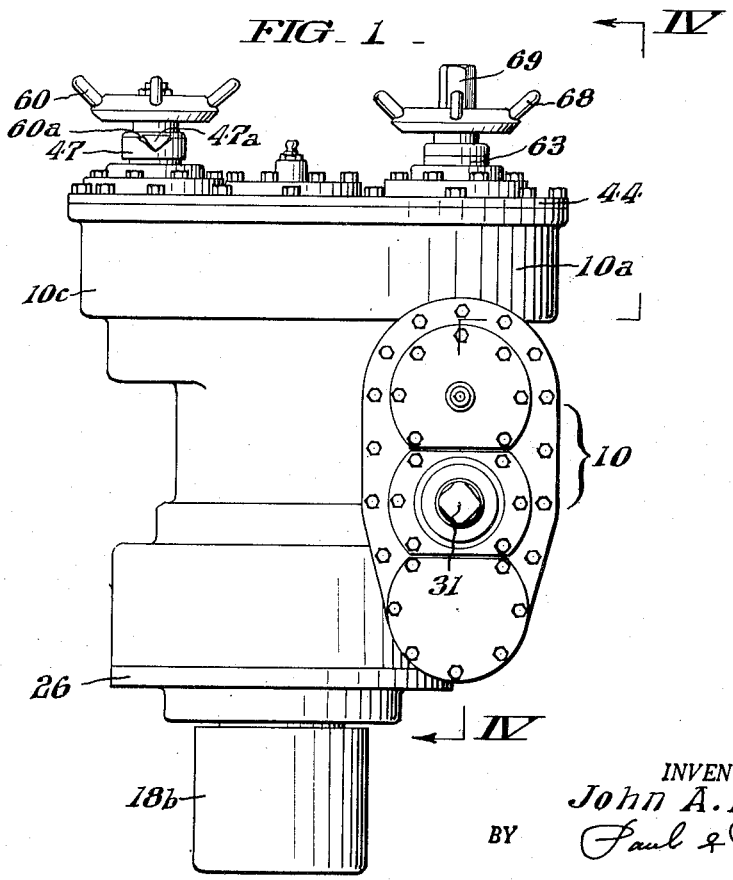
INVENTOR.
John A. Hess,
BY Paul & Paul
ATTORNEYS.

Jan. 15, 1957 — J. A. HESS — 2,777,339
PORTABLE BORING MACHINE
Filed July 30, 1953 — 5 Sheets-Sheet 2

INVENTOR.
John A. Hess,
BY Paul & Paul
ATTORNEYS.

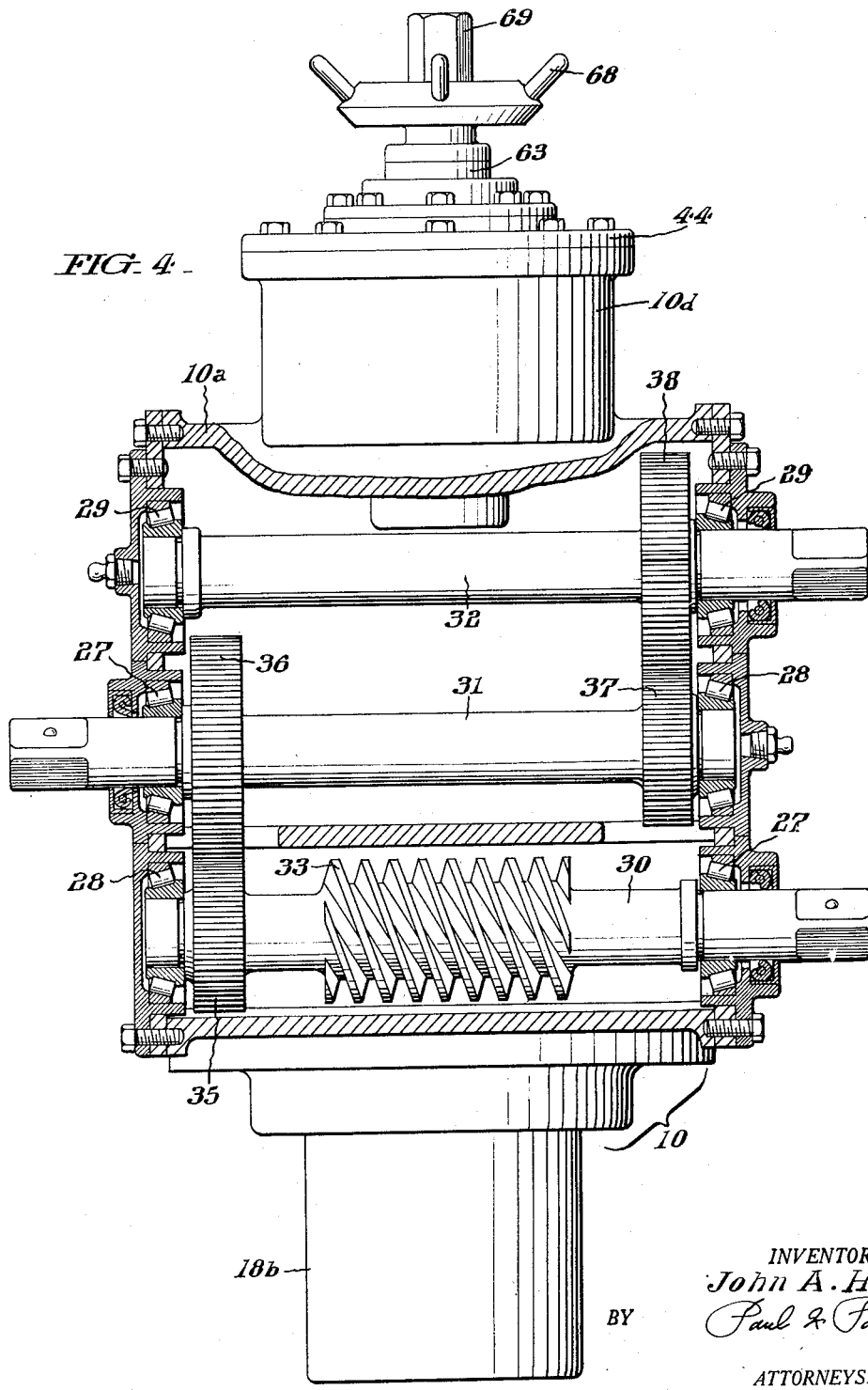

Jan. 15, 1957     J. A. HESS     2,777,339
PORTABLE BORING MACHINE
Filed July 30, 1953                        5 Sheets-Sheet 4
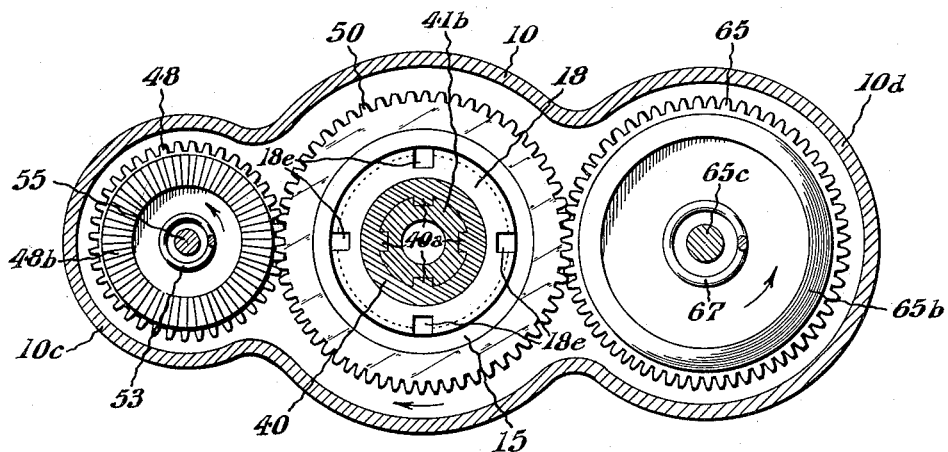
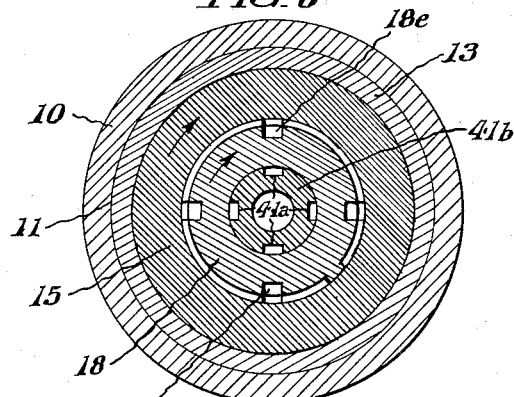
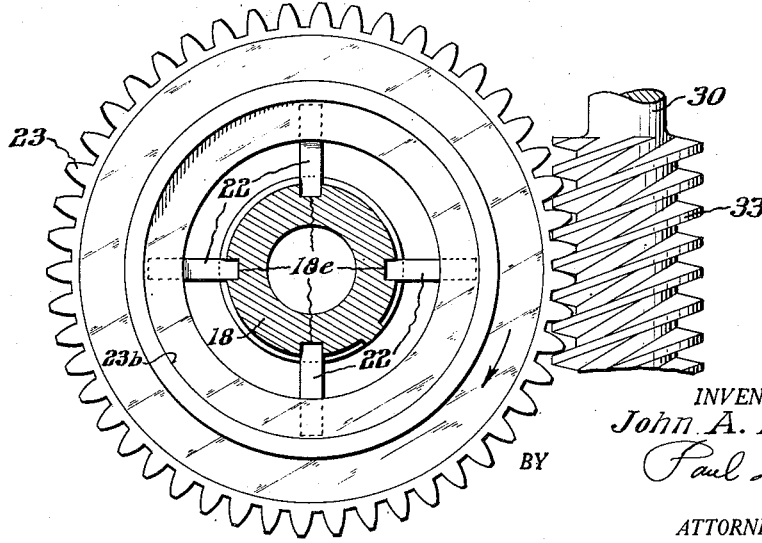
INVENTOR.
John A. Hess,
BY Paul & Paul
ATTORNEYS.

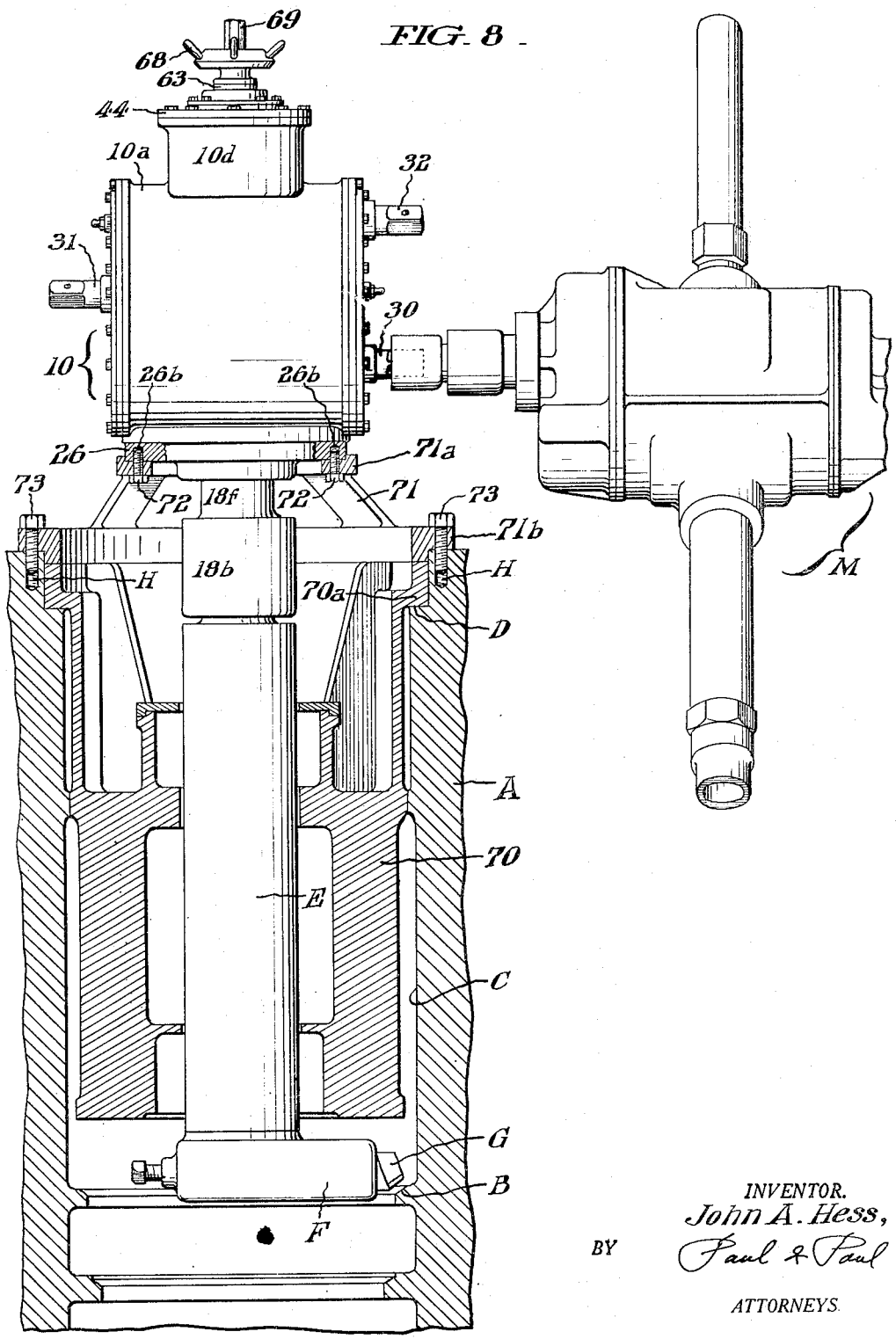

United States Patent Office 2,777,339
Patented Jan. 15, 1957

2,777,339
PORTABLE BORING MACHINE

John A. Hess, Columbus, Ohio

Application July 30, 1953, Serial No. 371,365

6 Claims. (Cl. 77—2)

This invention relates to portable boring machines. My invention has for its chief aim, the provision of a rugged and reliable portable power driven machine intended more especially for use in making repairs to diesel electric locomotives such as re-boring damaged and repaired cylinder sleeve fits, long shaft bearings and the like, cutting or grinding welded material, etc.

In connection with a machine of the kind referred to, I further aim to provide selective drive mechanism whereby the rotative speed of the tool-carrying spindle and the rate of its advance can be changed as may be necessary or desirable for different boring operations, and whereby the spindle can be made to rotate only when the machine is to be used in boring or grinding operations.

Another object of my invention is to attain the above advantages in a boring and grinding machine which is relatively light in weight and compact, and therefore easily handled.

Another object is to embody in the drive mechanism of a machine having the aforementioned attributes, protective means capable of yielding in the event abnormal resistance is encountered to the turning or axial advance of the tool carrying spindle during either boring or grinding operations.

Other objects and attendant advantages will appear from the following detailed description of the attached drawings, wherein:

Fig. 1 shows the front elevation of a portable boring machine conveniently embodying my invention.

Fig. 2 shows the machine in top plan.

Fig. 4 is a broken out view partly in elevation as seen from the right of Figs. 1 and 3, and partly in section taken as indicated by the angled arrows IV—IV in the latter illustrations.

Figs. 5, 6 and 7 are horizontal sections taken as indicated respectively by the arrows V—V, VI—VI and VII—VII in Fig. 3; and Fig. 8 shows one of the uses for which the machine is adapted.

Figure 3:
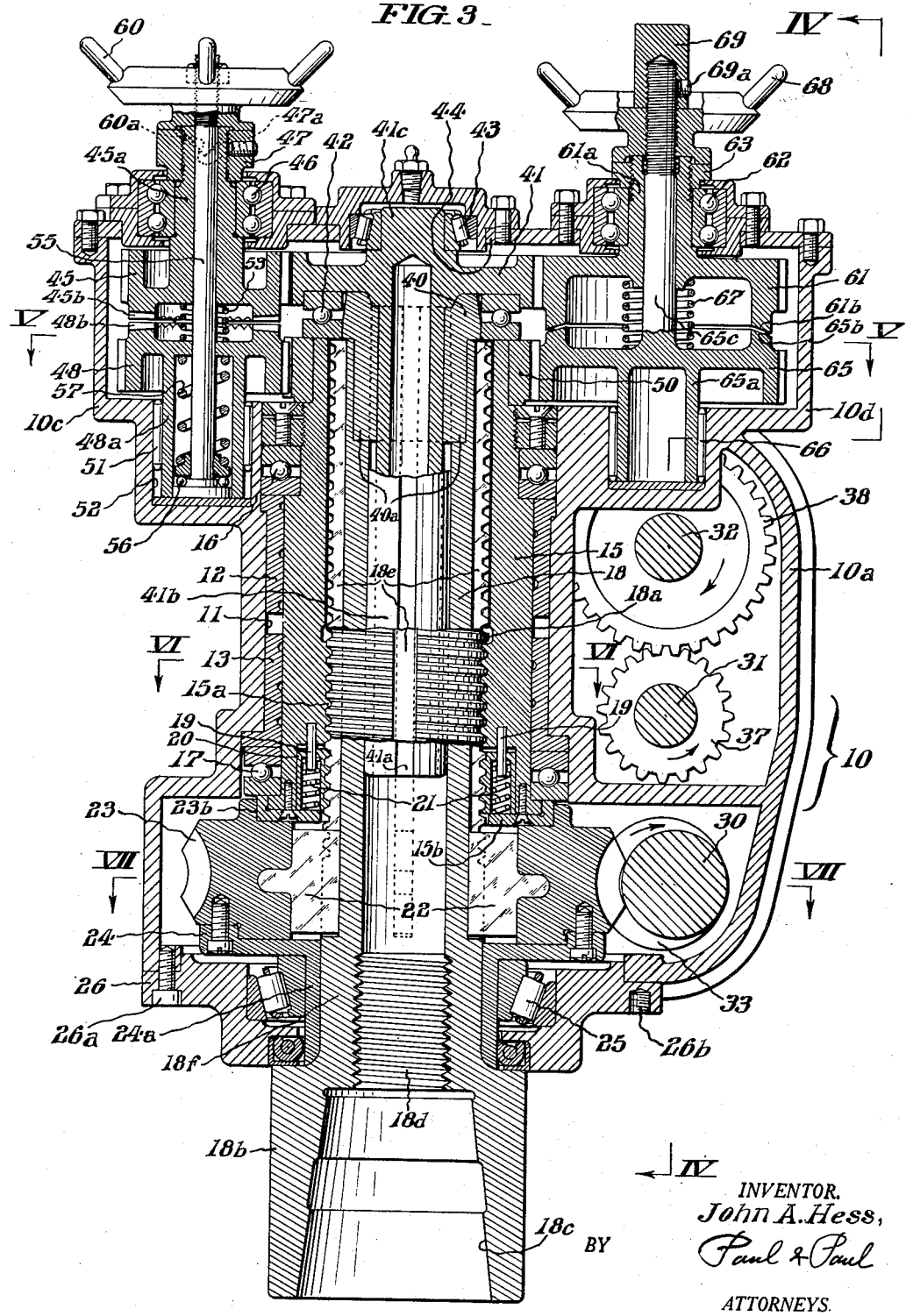
Fig. 3 is an axial section of the machine taken as indicated by the angled arrows III—III in Fig. 2.

With more detailed reference first more especially to Figs. 1–6 of these illustrations, the numeral 10 comprehensively designates the casing of my improved boring machine in which all of the moving parts are housed. As shown, casing 10 has a vertical bore 11 which is bushed as at 12 and 13 for reception of a sleeve 15, said sleeve being rotatively supported by ball bearings 16 and 17 and provided at its lower end portion with an internal left hand screw thread 15a. In turn disposed within sleeve 15 is a tubular spindle 18 which has a left hand external thread 18a engaged with the internal thread 15a of said sleeve, the lower protruding end 18b of the spindle being enlarged and internally coned and tapped as at 18c and 18d respectively, for connection of the shank ends of interchangeable tools of various sizes and types such as are ordinarily used in boring or grinding operations. Recessed into the bottom of sleeve 15 and connected thereto, with capacity for limited independent relative axial movement by a plurality of circumferentially-arranged pins 19, is a wear take-up nut 20 which also engages the thread 18a of spindle 18 and which is yieldingly urged upwardly by a plurality of circumferentially arranged springs 21 retained in assembly by a hardened wear plate 15b screw secured to the bottom end of said sleeve. Spindle 18 is provided with longitudinal keyways 18e in quadrant relation which are engaged by keys 22 set into a worm gear 23 whereto is secured, at the bottom, a disk 24 with a downward axial bushing projection 24a in which the portion 18f of spindle 18 is received. Worm gear 23 is sustained by a tapered roller thrust bearing 25 whereof the inner race surrounds the axial projection 24a of disk 24, and whereof the outer race is held in place by an axially apertured cover plate 26 secured to the bottom of casing 10 by a number of circumferentially arranged screws 26a of which the heads are recessed into the peripheral flange of said plate. For a purpose later on explained, the closure plate 26 is provided, at circumferential intervals between the holes for the screws 26a with tapped apertures such as the one indicated at 26b. It is to be particularly noted that worm gear 23 is axially recessed at the top as at 23b to engage over a hardened wear plate 15b at the bottom of sleeve 15. Worm gear 23 is thus sturdily supported within casing 10 in accurate relation to sleeve 15 as well as to spindle 18.

Respectively journalled in roller bearings 27, 28 and 29 (Figs. 1 to 4) within a lateral offset 10a of casing 10, are three transversely-arranged parallel high, intermediate and low speed shafts 30, 31 and 32 of which the lower one is formed with a worm 33 that meshes with worm gear 22. As shown in Fig. 4, the high and low speed shafts 30 and 32 protrude at one side of the casing offset 10a, and the intermediate speed shaft 31 at the opposite side of said offset for selective connection of a suitable power drive means. A pair of speed change spur gears 35, 36 connect shaft 30 with shaft 31, and a pair of speed change spur gears 37 and 38 similarly connect shaft 31 with shaft 33 within casing offset 10a.

Force fitted into the upper end of spindle 18 is a shouldered bushing 40 having longitudinal projections 40a (Fig. 3) in quadrant relation slidably engaged with corresponding keyways 41a in the pendant shaft portion 41b of a spur gear wheel 41, said shaft portion extending down into the axial hollow of spindle 18. Gear wheel 41 is rotatively sustained by a ball bearing 42, and the upstanding axial projection 41c thereof is journalled in a smaller roller bearing 43 set into the top cover plate 44 of casing 10. Housed within a lateral offset 10c at the top of casing 10 at one side is a smaller transmission gear 45 of the spur type which meshes with spur gear 41. The upwardly extending hub 45a of gear 45 is journalled in another ball bearing 46 set into the top cover plate 44 of casing 10, and to the protruding end of said shaft is affixed a retaining collar 47. At the bottom, spur gear 45 is provided with a ring of inclined ratchet-like clutch teeth 45b in confronting relation to similar clutch teeth 48b on the top face of an axially aligned transmission gear 48 which meshes with a spur gear 50 affixed to sleeve 15 at the top. The pendant hollow hub portion 48a of transmission gear 48 is slidably journalled in a pin bearing 51 set into a depression 52 in the bottom of casing offset 10c. Normally, transmission gears 45 and 48 are held out of clutching engagement by the interposed helical spring indicated at 53. Extending axially through transmission gears 45 and 48 is a rod 55 which, at the bottom, carries a small ball bearing 56; and compressed between said bearing and the base end of the axial hub hollow of gear 48 is a heavier helical spring 57. Secured upon the upper threaded end of rod 55 is a hand wheel 60 whereof the hub is provided, at the bottom, with pointed diametral projections 60a to cooperate with V-shaped cam notches 47a in the top of collar 47. Accordingly, as hand wheel 60 is turned, gear 48 is raised against the resistance of spring 53 into clutching engagement with gear 45, the heavier and stronger spring 57 remaining "solid" at this time.

Another lateral offset 10d at the top of casing 10 opposite offset 10c is occupied by a transmission gear 61 which also meshes with spur wheel 41 associated with spindle 18. Like wheel 45, previously described, transmission gear 61 has an upwardly extending hub 61a which is journalled in a third ball bearing 62 set into the top cover plate 44 of casing 10, and to the protruding top end of which is affixed a retaining collar 63. At the bottom, transmission gear 61 is formed with a beveled annular flange 61b confronting a correspondingly beveled annular flange 65b at the top of a coaxially aligned transmission gear 65 which meshes with spur gear 50 at the upper end of sleeve 15. The pendant hub extension 65a of transmission gear 65 is slidably journalled in a pin roller bearing 66 recessed into the bottom of casing offset 10d. The compression spring designated 67 serves ot keep transmission gear 65 normally depressed as shown, out of engagement with transmission gear 61. Gear 65 is provided with a shaft prolongation 65c which extends upwardly and outwardly through the hub 61a of spur gear 61. Threadedly engaged upon the protruding end portion of the shaft prolongation 65c of gear 65 is a hand wheel 68 whereof the hub bears upon the top of collar 63. It is to be noted that gear 41 is slightly larger than gear 50, actually to the extent of one tooth, and that transmission gear 45 is slightly smaller than transmission gear 48, actually to the extent of one tooth. It is to be further noted that transmission gear 61 is somewhat smaller than gear 41 likewise actually by one tooth and is of the same size as gear 50, while transmission gear 65 corresponds in size to gear 41. These gears are of course all of the same pitch, gears 41 and 40 respectively having, in this instance, sixty-two and sixty-one teeth, gears 45 and 48 respectively having thirty-nine and forty teeth, and gears 61 and 65 respectively having sixty-one and sixty-two teeth. For a purposee later explained, shaft 65c of gear 65 is provided at its outer end with a polygonal nut head 69 which is made fast by a set screw 69a.

Operation

Assume that power is applied to low speed shaft 32 in the direction indicated by the arrow in Fig. 3. With the parts positioned as in Fig. 3 of the drawings, it will be seen that, through worm 33 and worm gear 22, spindle 18 will be rotated clockwise and with it the sleeve 18 and spur wheels 41 and 50, when intermeshing transmission wheels 45, 48, 61 and 65 will simply revolve idly. Now if boring is to be done, hand wheel 60 is turned through ninety degrees with the result that transmission gear 48 will be raised into clutching engagement with transmission gear 45. Under these conditions, transmission gear 45 will be positively driven by spur gear 41, and through clutched transmission gear 48, gear 50 affixed to the top of sleeve 15 will be driven, in turn, with consequent impartation of rotation to said sleeve in clockwise direction. Due to the proportioning of the gears 41, 45 and 48, 50 as hereinbefore described, sleeve 15 and spindle 18 will be differentially rotated in the same direction so that, by the action of the interengaged screw threads 15a and 18a respectively of said sleeve and said spindle, the spindle will concurrently be advanced axially at a definite uniform rate as it rotates, as required for boring purposes. In the event that, for any reason, abnormal resistance to the axial advance of the spindle should occur during boring, the inclined clutch teeth 45b, 48b of transmission gears 45, 48 will simply slip or ratchet over each other as allowed by the yielding action of spring 57. Injury to or derangement of the mechanism of the machine is in this way positively precluded.

If rotation of spindle 18 only is desired, as when the machine is to be used for grinding or similar operations, hand wheel 68 is turned to bring transmission gear 65 into engagement with transmission gear 61. As a consequence of being now frictionally connected to transmission gear 61, transmission gear 65 will drive gear 50 fixed to the top of sleeve 15 and cause rotation of the latter clockwise. However due to the proportioning and arrangement of gears 41, 61 and 50, 65, sleeve 15 will, in this instance, be rotated in the same direction and at the same speed as spindle 18 which latter will therefore not be advanced axailly as in the first described use of the machine. Here again, slippage can take place between the gears 61 and 65 in the event that spindle 18 meets with abnormal resistance to being turned. It is to be noted that the spline shaft prolongation 41b of drive gear 41 is somewhat shorter than the thread length of sleeve 15, actually by about one inch. Accordingly, as the spindle 18 is run out within one inch of the end of the thread of sleeve 15, the spline shaft 41b is disengaged from spindle 18, and the feed stops with one inch of thread still holding said spindle from falling out.

With both clutches disconnected as in Fig. 3, and spur gear 41 revolving clockwise, spindle 18 will not run out, but on the contrary, will be retracted to "in" position by interaction of the thread 18a thereon with the internal thread 15a of sleeve 15. Upon complete retraction, the spindle 18 will simply rotate with the sleeve. The necessity for reversing the drive to effect spindle retraction is thus entirely obviated.

If higher speed operation of the machine is desired for boring or for grinding, the power connection is simply made either to shaft 31 or to shaft 32 as will be readily understood.

It is to be further seen that if the operator should inadvertently clutch gears 61 and 65 while gears 45 and 48 are still connected, spring 57 will allow the latter gears to ratchet to protect the mechanism against injury, the attendant noise serving to warn the operator of the necessity for correcting his mistake.

A typical use of the machine is illustrated in Fig. 8 wherein the letter A designates the cylinder block of a diesel engine of which the beveled seat B within the cylinder bore C is to be refinished. For the purpose of putting the machine to such use, I have provided an adaptor means, which includes a component 70 in the form of a sleeve for guiding the tool bar connected to spindle 18, and an open spider-like component 71. As shown, the sleeve component 70 has a concentric circumferential stop flange 70a at its upper end to snugly seat into the usual recessed top portion D of the cylinder bore C. The component 71 has an annular top flange 71a which is axially recessed for reception of the peripheral flange of the bottom coverplate 26 of the casing 10, and a coaxial annular bottom flange 71b with a downward offset to fit snugly into the recessed top portion D of the cylinder bore and to bear downwardly upon the stop flange 70a of component 70. The top flange 71a of component 71 is apertured for passage of the shanks of cap screws 72 into the tapped holes 26b in the peripheral flange of closure plate 26. By the means just described, the component 71 is removably secured to the casing 10 of the machine with its flanges 71a and 71b in coaxial relation to the spindle axis. The boring bar E here employed has a head F at its bottom or distal end with a cutting tool G for refinishing the beveled seat B within the cylinder box C. After the sleeve component 70, together with the tool bar E, is inserted downward into the cylinder bore C, said component and the machine as a whole are made fast by cap screws 73 whereof the shanks are passed through preallocated apertures in flange 71b of component 71 and engaged into some of the tapped holes H in the engine block frame which the usual cylinder head securing studs (not shown) have been temporarily removed. As the machine is operated in the manner hereinbefore described under drive of an air motor designated M in Fig. 8, the spindle 18 and the attached boring bar E are rotated and at the same time axially advanced to bring the cutting tool G into cutting engagement with the beveled seat B, the tool bar being axially guided all the while within the cylinder bore C by the sleeve component 70 of the adapter means. In this way the sleeve component is firmly held in position and the machine rigidly supported against displacement relative to the engine block during the boring. Accordingly, through my invention it is possible to re-bore engine cylinders and the like in a minimum of time with assurance of absolute accuracy and trueness.

By applying a handcrank of the like to the nut head 69 at the outer end of the shaft 65c of gear 65 to turn the latter with both clutches disengaged, it is possible, moreover, to move the spindle 18 in or out within its complete range to spot the tool or grinding device in starting the cut.

With boring machines as heretofore generally constructed, when the feed is used for facing and the tool is advanced close to the finishing size, the machine must be stopped and a lock collar or similar device tightened to hold the spindle in fixed position laterally before disengaging the feed to finish a joint or shoulder. In doing this, the cutting edge of the tool is damaged or the spindle is moved laterally slightly as a consequence of which it is difficult to effect a finish or joint of the desired or required accuracy. This drawback is entirely obviated with my new machine since it is necessary only to close the friction clutch 61b, 65b with the feed clutch 45b, 48b still engaged and the spindle running. This positively prevents lateral movement of the spindle without incurring any damage to the feed gears due to the ratcheting safety feature provided.

Having thus described my invention, I claim:

1. In a portable boring machine, a casing; a sleeve rotatably supported within the casing and having a spur gear affixed to its upper end; a hollow tool-carrying spindle fitting within the sleeve and having a screw connection therewith; a drive gear in the lower portion of the casing with which the spindle has a sliding spline connection; a spur gear of a different size rotatably supported with the upper part of the casing above the first mentioned spur gear and provided with a relatively long pendant shaft prolongation, said prolongation extending partway down into the hollow of the spindle and having a sliding spline connection with the bore of the said spindle; a pair of normally idling and separated coaxial transmission gears in mesh respectively with the spur gear on the sleeve and with the spur gear spline-connected to the spindle; releasable means whereby said pair of gears can be clutched together to cause differential rotation of the sleeve relative to the spindle and concurrent axial movement of the latter through the medium of the screw connection between the sleeve and the spindle; a pair of normally idling and separated coaxially-arranged auxiliary upper and lower transmission gears in mesh respectively with the gear spline-connected to the spindle and the gear at the upper end of the sleeve, the upper auxiliary transmission gear being of the same size as the spindle gear and the lower auxiliary transmission gear being of the same size as the sleeve gear; and means whereby said auxiliary transmission gears can be clutched together to cause the sleeve and the spindle to rotate together at the same speed and in the same direction without impartation of attendant axial movement to said spindle.

2. A portable boring machine according to claim 1, wherein the confronting faces of the auxiliary transmission gears are provided with slip friction clutch faces; wherein one of the auxiliary transmission gears is sustained against axial movement and wherein the other is axially shiftable into and out of clutching engagement with its mate; and wherein the two auxiliary transmission gears are normally held separated by an interposed compression spring.

3. A portable boring machine according to claim 1, wherein the confronting faces of the auxiliary transmission gears are provided with slip friction clutch faces; wherein the upper auxiliary transmission gear is restrained against axial movement and has a hub extending upward through a bearing to the exterior of the casing; wherein the two auxiliary transmission gears are normally held separated by an interposed compression spring; wherein the lower auxiliary transmission gear is secured to a shaft which extends upward freely through and beyond the hub of the upper auxiliary transmission gear; and wherein an adjusting wheel having threaded engagement with the protruding end of the shaft of the lower transmission gear bears on the top of the hub of the upper auxiliary transmission gear.

4. In a portable boring machine, a casing; a sleeve rotatably supported within the casing and having a gear affixed to its upper end; a hollow tool-carrying spindle fitting within the sleeve and having a screw connection therewith; a drive gear in the lower portion of the casing with which the spindle has a sliding spline connection; a spur gear of a different size rotatively supported in the upper part of the casing above the first mentioned gear and provided with a pendent shaft prolongation, said prolongation extending part way down into the hollow of the spindle and having a spline connection therewith; a pair of normally idling and separated coaxial transmission gears in mesh respectively with the fixed gear on the sleeve and with the gear spline connected to the spindle, the confronting faces of the transmission gears having annular series of inclined interengageable clutch teeth, one of said transmission gears being held against axial shifting and the other being axially shiftable into clutching engagement with the first; a spring for normally maintaining the two transmission gears separated and unclutched; a rod extending freely through the two transmission gears to the exterior of the casing and having a stop head at its inner end; a normally relaxed heavier spring interposed between the stop head of the rod and the axially shiftable transmission gear; and releasable means exteriorly of the casing whereby the rod is liftable to bring the shiftable transmission gear into clutching engagement with the companion transmission gear with capacity of the clutch teeth to slip over each other under the yielding action of the heavier spring in the event of abnormal resistance to the turning and/or axial movement of the spindle during the boring.

5. In a portable boring machine, a casing; a sleeve rotatably supported within the casing and having a gear affixed to its upper end; a hollow tool-carrying spindle fitting within the sleeve and having a screw connection therewith; a drive gear in the lower portion of the casing with which the spindle has a sliding spline connection; a spur gear of a different size rotatively supported in the upper part of the casing above the first mentioned gear and provided with a pendent shaft prolongation, said prolongation extending part way down into the hollow of the spindle and having a spline connection therewith; a pair of normally idling and separated coaxial transmission gears in mesh respectively with the fixed gear on the sleeve and with the gear spline connected to the spindle, the confronting faces of the transmission gears having annular series of inclined interengageable clutch teeth, one of said transmission gears being held against axial shifting and the other being axially shiftable into clutching engagement with the first; a spring for normally maintaining the two transmission gears separated and unclutched; a rod extending freely through the two transmission gears to the exterior of the casing and having a stop head at its inner end; a normally relaxed heavier spring interposed between the stop head of the rod and the axially shiftable transmission gear; a hand wheel at the outer end of the rod; and fixed cam means exteriorly of the casing cooperative with the hand wheel upon turning of the latter through a partial rotation, to cause the rod to be lifted and the transmission gears to be brought into clutching engagement with capacity of the clutch teeth thereon to slip over each other under the yielding action of the stronger spring in the event of abnormal resistance to the turning and/or axial movement of the spindle during the boring.

6. A boring machine, according to claim 4, further including a nut collar slidably connected to and rotative with the sleeve and engaged with the thread of the spindle; and spring means tending to urge the collar endwise relative to the sleeve to automatically compensate for wear of the threads.

References Cited in the file of this patent

UNITED STATES PATENTS

| 796,731 | Kardatzke et al. | Aug. 8, 1905 |
| 1,366,716 | Chapman | Jan. 25, 1921 |
| 1,541,062 | Myers | June 9, 1925 |
| 1,814,078 | Cole et al. | July 14, 1931 |
| 2,407,341 | Meyer | Sept. 10, 1945 |
| 2,474,726 | De La Source | June 28, 1949 |

FOREIGN PATENTS

| 880,940 | France | Jan. 11, 1943 |